US008490943B2

(12) United States Patent
Bühler et al.

(10) Patent No.: US 8,490,943 B2
(45) Date of Patent: Jul. 23, 2013

(54) VALVE ACTUATOR WITH CUSTOMIZABLE OVERLOAD CLUTCH

(75) Inventors: Daniel Bühler, Uster (CH); Jörg Evertz, Birmensdorf (CH); Martin Sprecher, Cham (CH); Uwe Werner, Uitikon Waldegg (CH)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 12/929,739

(22) Filed: Feb. 11, 2011

(65) Prior Publication Data

US 2011/0204274 A1    Aug. 25, 2011

(30) Foreign Application Priority Data

Feb. 11, 2010 (EP) ........................... 10153357

(51) Int. Cl.
*F16K 31/44*       (2006.01)
(52) U.S. Cl.
USPC ................... 251/81; 251/79; 251/95
(58) Field of Classification Search
USPC .............. 251/79, 80, 81, 95, 96, 129.03
See application file for complete search history.

(56) References Cited

U.S. PATENT DOCUMENTS

| | | | | |
|---|---|---|---|---|
| 1,534,701 A * | 4/1925 | Gray | ................... | 464/38 |
| 1,662,134 A * | 3/1928 | Smith | ................... | 74/425 |
| 1,908,763 A * | 5/1933 | Kelty | ................... | 137/552 |
| 1,990,090 A * | 2/1935 | Packard | ................... | 251/81 |
| 2,632,473 A * | 3/1953 | Hollerith | ................... | 251/81 |
| 2,672,292 A * | 3/1954 | Caparone et al. | ........... | 236/21 R |
| 2,746,472 A * | 5/1956 | Sogge | ................... | 137/66 |
| 2,855,940 A * | 10/1958 | Milleville et al. | ................. | 137/1 |
| 3,441,115 A * | 4/1969 | Gunther | ................... | 464/36 |
| 3,461,912 A * | 8/1969 | Morgan et al. | ............. | 137/636.4 |
| 3,524,526 A * | 8/1970 | Denkowski | ................. | 192/141 |
| 4,994,001 A * | 2/1991 | Wilkinson et al. | ................ | 475/4 |
| 5,477,752 A * | 12/1995 | West et al. | ................. | 74/625 |
| 5,901,817 A | 5/1999 | Gitnes | | |
| 6,015,142 A * | 1/2000 | Ulicny | ................... | 267/154 |
| 6,745,725 B2 * | 6/2004 | Toniolo et al. | ................ | 122/504 |
| 2009/0302246 A1 * | 12/2009 | Dolenti et al. | .................. | 251/81 |
| 2011/0198525 A1 | 8/2011 | Yu | | |
| 2012/0247912 A1 * | 10/2012 | Niiro | ................... | 192/12 D |

FOREIGN PATENT DOCUMENTS

| | | |
|---|---|---|
| CN | 1197900 | 11/1998 |
| CN | 2584930 | 11/2003 |
| CN | 101144546 | 3/2008 |
| CN | 201382096 | 1/2010 |
| DE | 2134430 | 1/1972 |

(Continued)

*Primary Examiner* — John K Fristoe, Jr.
*Assistant Examiner* — Umashankar Venkatesan
(74) *Attorney, Agent, or Firm* — Staas & Halsey LLP (57) ABSTRACT

A valve of a heating, ventilation and/or air conditioning system includes an actuator with a housing and a shaft which is arranged at least partially in the housing and which can be coupled directly or indirectly to the valve such that the valve can be adjusted during a rotation of the shaft. A hand-operated element can be coupled to the shaft via an overload clutch arranged between the hand-operated element and the shaft which limits a torque which is transmitted onto the shaft by the hand-operated element to a predetermined maximum value. The overload clutch has a coupling element and a replaceable spring element which presses the coupling element against the shaft such that the maximum value for the transmittable torque is dependent on the replaceable spring element.

13 Claims, 6 Drawing Sheets

FOREIGN PATENT DOCUMENTS

| | | | |
|---|---|---|---|
| DE | 10034919 A1 | 2/2002 | |
| EP | 10153357 | 2/2010 | |
| FR | 2706972 A1 | 12/1994 | |
| GB | 2360071 A1 | 9/2001 | |
| WO | 2005/012064 A1 | 2/2005 | |
| WO | 2007/130041 A1 | 11/2007 | |

* cited by examiner

VALVE ACTUATOR WITH CUSTOMIZABLE OVERLOAD CLUTCH

CROSS REFERENCE TO RELATED APPLICATIONS

This application is based on and hereby claims priority to European Patent Application No. 10153357 filed on Feb. 11, 2010, the contents of which are hereby incorporated by reference.

BACKGROUND

Described below is an actuator for a valve, in particular for a valve of a heating, ventilation and/or air conditioning system.

In many applications in the field of heating, ventilation and air conditioning (HVAC) technology, a heat transfer medium is used in order to transfer thermal energy from a source location to a destination location. The transfer of thermal energy can serve the purpose of heating a room or a zone within a building. In this case the heat transfer medium absorbs thermal energy at the source location and releases at least part of it again after being conveyed to the destination location. Equally, the transfer of thermal energy can also serve to cool a room or a zone within a building. In this case the heat exchange medium absorbs thermal energy at the destination location and releases at least part of it again at the source location.

The heat transfer medium can be any desired fluid. Water is used in most cases. Water has the advantage that it has a high specific thermal capacity and therefore can convey a particularly great heat flow volume per unit mass.

Valves, also known as HVAC valves, are used in order to control or regulate the flow of heat transfer medium in an HVAC system. For example, the flow rate of the heat transfer medium can be varied by what is termed a cutoff or restrictor valve. Suitable mixing of the heat transfer medium at a specific temperature level with a heat transfer medium at a different temperature level can be realized by a multiway valve and as a result the heat output capacity can be varied.

HVAC valves have an actuator which in principle can be driven or, as the case may be, adjusted by way of different types of actuators. (A) A first type of actuator is, for example, a motor which, when provided with suitable control, permits an automatic adjustment of the valve. (B) A second type of actuator is a manual adjustment mechanism, a handwheel for example, with which an operator can manually adjust the HVAC valve in question. The possibility of manual adjustment can be of advantage in particular when an HVAC system is put into operation for the first time. (C) Constituting a third type of actuator is what is termed a return spring, which, after the HVAC valve has been adjusted by a manual adjustment mechanism and/or a motor, automatically resets the HVAC valve to its starting position, after a power outage for example. As well as the aforementioned actuator (A), an HVAC valve typically has in addition the aforementioned actuator(s) (B) and/or (C). Various actuators are available for HVAC valves, these being briefly explained below:

Non Spring Return (NSR) actuators: This type of valve actuator has a motor and a manual adjustment mechanism. No return spring is present, so NSR actuators are also called non-spring return actuators.

With Spring Return (WSR) actuators: This type of valve actuator has as its possible energy sources a motor, a return spring and a manual adjustment mechanism. A WSR actuator is normally driven by the motor in what is termed auto mode. However, if a supply voltage for the motor fails, the valve driven by the actuator is closed by the return spring. If no supply voltage is present at the motor, the WSR actuator can be opened manually and locked in any desired position. As soon as the supply voltage is applied once more, the WSR actuator is unlocked again and the WSR actuator switches over to normal auto-mode operation.

Technischer Überwachungs-Verein (TÜV) Spring Return (TSR) actuators: Valve actuators of this type, which are also referred to as spring return actuators, have a motor and a return spring as possible energy sources. Owing to TÜV (Germany's Technical Inspection Authority) standards that are to be complied with for certain applications, TSR actuators must not have any manual adjustment mechanism. In the event of a power outage the return spring automatically closes the HVAC valve coupled to the TSR actuator.

Actuators for HVAC valves must have a number of technical characteristics and/or fulfill a number of technical requirements in order to be used for HVAC systems in real-world applications. Thus, for example, depending on operating mode, a suitable actuator must be able to switch one of the three energy sources "motor", "return spring" and "manual adjuster" to a movable restrictor element of an HVAC valve.

Furthermore, the torque which can act on the valve or on a gearing mechanism of the actuator by the manual adjustment mechanism should be limited by a suitable overload clutch so that intentional and/or accidental damage to actuator and/or valve can be prevented. However, known torque-limiting devices for HVAC valves are technically relatively complex, and inflexible besides, since a predetermined maximum torque to be transmitted cannot be varied.

SUMMARY

Described herein is an actuator for a valve which provides a simple torque limiting which at the same time is flexible in terms of the maximum torque to be transmitted.

According to a first aspect, an actuator for a valve, in particular for a valve of a heating, ventilation and/or air conditioning system, is described. The described actuator has (a) a housing, (b) a shaft which is arranged at least partially in the housing and which can be coupled directly or indirectly to the valve such that the valve can be adjusted during a rotation of the shaft, (c) a hand-operated element which can be coupled to the shaft, and (d) an overload clutch which is arranged between the hand-operated element and the shaft and which limits a torque that is transmitted from the hand-operated element onto the shaft to a predetermined maximum value. The overload clutch has a coupling element and a replaceable spring element which presses the coupling element against the shaft such that the maximum value for the transmittable torque is dependent on the replaceable spring element.

The actuator described is based on the knowledge that through suitable choice of the replaceable spring element the maximum torque which can be transmitted by the overload clutch can be easily and efficiently matched to the particular requirements. This means that the triggering torques of the described overload clutch can be tailored to different values as a function of the choice of the spring element.

For example, the replaceable spring element can be dimensioned such that on the one hand a reliable manual adjustment of the valve is possible and on the other hand, when the valve is in its open or closed end position for example, damage to the valve or to a gearing mechanism arranged between valve and actuator can be reliably prevented even in the event of a forceful actuation of the hand-operated element.

The maximum value for the torque transmission can be dependent in particular on the shape, the size and/or the material of the spring element. These parameters can determine the elasticity or the tension force of the replaceable spring element. The tension force can in turn determine the bearing force between the coupling element and the shaft. The tension force and hence also the bearing force or bearing pressure between coupling element and shaft are, of course, also dependent on the position of the spring element relative to the coupling element.

The transfer of force or torque transmission between coupling element and shaft can be based on different interactions. Thus, a friction force that is dependent on the two mutually facing surfaces of coupling element and shaft can occur between coupling element and shaft. For example, at least one of the two surfaces can be a rubber surface which provides a great degree of friction and consequently prevents a premature slipping of the overload clutch. The two surfaces facing each other can also exhibit a certain roughness which likewise constitutes an important parameter for the transmittable torque or transmittable force in addition to the bearing pressure. Furthermore the friction between coupling element and shaft can also be caused by the magnetic field of one or more magnets, in particular permanent magnets, which are mounted on the shaft and/or on the coupling element.

The hand-operated element can be for example a simple handwheel which is actuated by an operator to effect a manual adjustment of the valve.

According to an exemplary embodiment, the replaceable spring element is mounted on a housing of the hand-operated element. In this case the replaceable spring element can be inserted in a correspondingly shaped recess of the housing. This can mean that the housing represents a suitable receptacle for the replaceable spring element. During the assembly of the described actuator the replaceable spring element can be simply inserted into the receptacle or recess for example. After the actuator has then been assembled, the spring element can then be installed in the receptacle or recess and hence fixed in its intended position. This can be effected automatically by other components of the actuator such that no separate operating step is necessary for fixing the spring element. Equally, a suitable locking mechanism such as a securing element for example can also be used to fix the spring element reliably in position in its receptacle or recess.

The receptacle may be embodied in the housing in such a way that different spring elements, each of which applies a different force or different pressure onto the spring element, can be accommodated. The different types of spring elements can, of course, also be embodied in such a way that they have the same or at least similar external dimensions and so facilitate an application-specific configuration of different variants of the actuator with different spring elements of different strengths in a simple manner.

According to another exemplary embodiment, the replaceable spring element has the shape of an elongate strip. The replaceable spring element is furthermore manufactured at least in part from a resilient material, in particular from metal. The replaceable spring element can in this case represent a simple leaf spring.

The described design can have the advantage that the replaceable spring element can be manufactured in a particular simple way. The replaceable spring element shaped in such a way can also be mounted without difficulty on, the aforementioned housing.

It is pointed out that replaceable spring elements or leaf springs of different strength can be easily manufactured in that, starting from a resilient original strip, sections of different sizes are cut out or off. In this way the external shape of the strip is essentially retained. By virtue of different local widths of the strip, an individual spring stiffness, easily visible from outside, can be set.

According to a further exemplary embodiment, the coupling element has a first tooth system and the shaft a second tooth system, wherein the first tooth system and the second tooth system at least partially intermesh. This has the advantage that the overload clutch can be realized within a small installation space and is nonetheless able to transmit high torques, when necessary in conjunction with a strong spring element.

In the assembled state of the actuator the coupling element can at least partially enclose the shaft, the first tooth system of the coupling element and the second tooth system of the shaft at least partially intermeshing.

The described overload clutch having a tooth system can be implemented in a simple manner to the effect that the respective triggering torque lies within a more or less precisely predetermined tolerance range. Furthermore, in the event of a triggering or opening of the overload clutch, readily perceptible feedback can be given to an operator.

Thus, for example, the operator can recognize the triggering of the overload clutch due a vibration caused by a relative movement of the two tooth systems and/or due to a corresponding vibration or grating noise.

According to a further exemplary embodiment, the actuator also has a motor which can be coupled to the shaft.

The actuator and consequently also the valve moved by the actuator can be automatically brought into a desired target position by suitable electrical activation of the motor.

According to a further exemplary embodiment, the actuator additionally has a working spring which can be coupled to the shaft.

The working spring can serve to switch the actuating device to a preferred position automatically when the hand-operated element is released and/or in the event of an outage of the supply voltage. This can be important in particular for safety-related applications.

According to another exemplary embodiment, the actuator also has a further shaft which can be coupled directly or indirectly to the valve, and a coupling mechanism which is arranged between the further shaft and the shaft. The coupling mechanism is configured in such a way that (a) in a first operating mode the hand-operated element is decoupled from the further shaft and (b) in a second operating mode the hand-operated element is coupled to the further shaft.

The coupling mechanism can be for example an engagement clutch in which the further shaft, which can also be described as the lower shaft, and the shaft are rigidly connected to each other in the second operating mode when the overload clutch is not triggered, and are at least partially decoupled from each other in the first operating mode. The coupling, i.e. a transition from the first to the second operating mode, can be effected by an intermeshing of different components of the coupling mechanism. A decoupling, i.e. a transition from the second to the first operating mode, can be effected by a reciprocal releasing of the different components from one another. Accordingly, the first operating mode and the second operating mode can also be referred to as a free-wheeling state and a coupling state, respectively.

The first operating mode can also be referred to as the normal operating mode, since a manual actuation or, as the case may be, valve adjustment is not necessary during the normal operation of the actuator. The second operating mode can be set for example when it is necessary to carry out maintenance work and/or modifications on an HVAC system and this activity is to be accomplished in a simple and efficient manner.

According to a further exemplary embodiment, one of the two operating modes is present when the further shaft is located in a disengaged position in relation to the shaft. Furthermore the other of the two operating modes is present when the further shaft is located in an engaged position in relation to the shaft. This can have the advantage that the actuator can be switched from the first operating mode to the second operating mode and vice versa by a particularly simple operating intervention.

The first operating mode or the freewheeling state may be present when the hand-operated element is disengaged or, as the case may be, withdrawn in relation to at least one other component of the actuator. Accordingly, the second operating mode or the coupling state is present when the hand-operated element is engaged or, as the case may be, pressed inward in relation to the at least one other component.

The engaged state can also be referred to as the "hand-mode push" state. The reason for this is that when the hand-operated element is engaged it is coupled into or onto the shaft. At the same time any motor present, which can also drive the shaft, can be decoupled from the shaft. The actuator or a valve driven by the actuator can then be adjusted by a simple movement of the hand-operated element without the fear of causing accidental damage to the motor or a gearing mechanism connected to the motor in the process.

According to another exemplary embodiment, the actuator also has a slipping clutch which is likewise arranged between the further shaft and the shaft and which is configured in such a way that the shaft rotates during a rotation of the further shaft even when the coupling mechanism is located in the first operating mode.

This means that the hand-operated element coupled to the shaft can be used not only for active manual driving of the shaft, but that the hand-operated element can also serve as an indicator device for a rotation of the further shaft which indicates to an operator by its own rotation that the further shaft is being rotated by another energy source.

By virtue of the slipping clutch, which typically can transmit only a very small torque from the further shaft onto the shaft, the hand-operated element which is coupled to the shaft and is otherwise at least approximately freewheeling constitutes an indicator which indicates a rotation of the shaft by its own rotation that has not been initiated by an operator.

The other energy source can be for example a motor and/or a working spring which can drive the shaft of an actuator for an HVAC valve in a known manner.

The slipping clutch may transmit only a very small torque in comparison with the above-described overload clutch. An at least approximately freewheeling hand-operated element can therefore be set into a rotational movement by the slipping clutch. If, however, the hand-operated element should be inhibited from performing a rotational movement from outside, then the slipping clutch can reliably prevent a malfunction of the actuator.

According to a further exemplary embodiment, the actuator also a locking element which is mounted on the hand-operated element and which is embodied in such a way that an adjustment of the hand-operated element relative to the housing is prevented when the locking element is activated. This has the advantage that an undesired movement of the hand-operated element can be prevented in a simple and reliable manner.

The locking element can be activated for example to allow maintenance and/or conversion work to be carried out on an HVAC system. Even where there is an existing electric cable connection to the motor (in the case of any electric motor control) an undesired adjustment of the actuator can be prevented. Time-consuming disconnection of electrical connections, as is necessary for maintenance activities in the case of known HVAC actuators, is no longer required with the actuator described here. As a result maintenance and/or conversion work can be completed considerably more quickly and efficiently.

According to a further exemplary embodiment, the locking element can be displaced radially in relation to the longitudinal axis of the shaft. In this case the locking element can be brought into engagement with the housing of the actuator in a suitable manner.

In this connection it is pointed out as a precautionary measure that the actuator housing cited here is different from the housing of the hand-operated element already mentioned further above.

The activation of the locking element by a radial displacement has the advantage that the hand-operated element can be blocked by an operator by a simple hand movement, possibly even simply by moving a single finger.

The engagement between locking element and housing prevents an undesired rotation of the hand-operated element.

Furthermore the locking element can additionally be brought into engagement with the housing in the axial direction also in relation to the shaft. This can be effected for example through engagement from below with a projection of the actuator housing. In this way a displacement of the hand-operated element in the axial direction can be prevented. In particular an unintended transition of the hand-operated element from the first operating mode to the second operating mode and vice versa can be prevented.

It is expressly pointed out that the locking element described here can be used both for the aforesaid radial engagement and simultaneously for the aforesaid axial engagement. In this way, a blocking of the hand-operated element in relation to all possible movement directions can be achieved in a simple manner.

It is furthermore pointed out that, insofar as the hand-operated element is not engaged or not held in the engaged position by the locking element, the lifting spring can automatically push the hand-operated element into a position in which the actuator is in what is termed an auto mode. Auto mode, in this context, means that the actuator is driven by a motor.

According to a further exemplary embodiment, the actuator also has a latching element which is arranged between the hand-operated element and the housing and which has a first latching zone and a second latching zone. In this case the first latching zone is configured to engage in a first surface contour of the hand-operated element. The second latching zone is correspondingly configured to engage in a second surface contour of the housing.

The first surface contour of the hand-operated element can have for example a plurality of projections which extend radially outward from a central shaft of the hand-operated element. The projections can be for example journals, pins, cams or any other type of elevations which are suitable for effecting a mechanical engagement between hand-operated element and latching element. When the first latching zone engages in the first surface contour it is ensured for example that during a rotation of the hand-operated element the latching element will also co-rotate with the hand-operated element. This is only possible if the second latching zone is not simultaneously engaging in the second surface contour embodied on the housing.

The first surface contour and the first latching zone may have a mutually complementary shape so that a reliable engagement is possible. The same can apply to the shaping of the second latching zone and the second surface contour.

According to another exemplary embodiment, the latching element is embodied in such a way that (a) the possibility of the engaging of the first latching zone in the first surface contour and/or (b) the possibility of the engaging of the second latching zone in the second surface contour are/is dependent on the position in which the hand-operated element is located. This can mean that the position or the setting of the hand-operated element will have an influence on the action of the latching element.

For example, the action of the latching element can be deactivated or prevented if the hand-operated element is in a disengaged position in relation to the shaft. In contrast thereto the above-described action of the latching element can be activated or enabled if the hand-operated element is in an engaged position in relation to the shaft. The terms "disengaged position" and "engaged position" have already been described precisely further above in this document and therefore will not be explained in detail again at this point.

An operator can activate or enable the action of the latching element as necessary by a simple engaging or pressing of the hand-operated element, and deactivate or inhibit the action of the latching element by disengaging or withdrawing the hand-operated element. This means that in the engaged position of the hand-operated element the latching element prevents a movement, in particular a rotation in the counterclockwise direction, of the hand-operated element. In the disengaged position there is then no blocking action for a movement, in particular for a rotation, of the hand-operated element.

According to another exemplary embodiment, the second latching zone of the latching element and/or the second surface contour of the housing are/is shaped in such a way that the latching element has a non-return functionality in relation to the housing. The non-return functionality described can have the advantage that following an actuation of the hand-operated element an undesired return of the hand-operated element, in particular due to the spring force of a working spring, can be prevented in a simple manner.

The non-return functionality can be based for example on the principle of a so-called ratchet pawl in which the second latching zone and/or the second surface contour have/has a tooth system with asymmetric tooth flanks.

It is pointed out that the non-return functionality can be embodied in such a way that the non-return function can be deactivated by a slight movement, in particular by a small rotation, of the hand-operated element in a predetermined direction. Such a deactivating movement of the hand-operated element can be effected for example by an actuator motor which is coupled to the shaft. To express it another way, moving the hand-operated element in a predetermined direction can cause the latching element to be released from barbed hooks which are embodied on the respective latching zone and/or on the respective surface contour.

For example, a rotation of the hand-operated element in the clockwise (counterclockwise) direction can be linked with only a slight resistance. During this rotation an operator can then feel a vibration and/or hear a vibration due to a corresponding vibration or grating noise. In contrast thereto a rotation in the counterclockwise (clockwise) direction is prevented as a result of the described ratchet pawl action.

According to a further exemplary embodiment, the actuator additionally has a lifting spring which engages with the hand-operated element and exerts a force onto the hand-operated element along the axial direction of the shaft.

In order to be able to exert the action of force onto the hand-operated element the lifting spring must also engage with another component of the actuator in addition. This other component can be the shaft for example. The lifting spring forces the aforementioned shaft, which constitutes an upper central shaft, away from the aforementioned further shaft, which constitutes a lower central shaft.

The described lifting spring has the advantage that the hand-operated element can be brought into different axial positions in relation to the shaft by a simple operating intervention of an operator. The different axial positions can be for example the above-described positions linked with different operating modes of the hand-operated element, in particular the disengaged position and the engaged position.

It is pointed out that according to an exemplary embodiment, the latching element can be activated by a combination of a displacement movement of the hand-operated element along the axial direction and a rotational movement in the clockwise direction of the aforementioned latching element. Thus, for example, in a blocked position (lock mode) the latching element can prevent an undesired adjustment of the actuator by a working spring of the actuator. As a result it is possible to prevent an undesired adjustment of the described actuator following a manual operating intervention by which the hand-operated element has been brought into a destination position.

The hand-operated element can be blocked in particular through a comparatively strong working spring being tensioned during a manual rotational movement of the hand-operated element. When the hand-operated element is released, the working spring then rotates the hand-operated element back somewhat until a next tooth system engages between the latching element and the housing. Because the working spring typically is comparatively strong, a high friction force is produced in the process between the above-described projections of the hand-operated element and the latching element. This friction force cannot be overcome by the considerably weaker lifting spring, with the result that the hand-operated element remains in the corresponding axial position. In this position a rotation of the hand-operated element is inhibited by the latching element. As a result, in spite of the action of force of the working spring, both the hand-operated element and the shaft remain in a stable (rotary) position.

The release (delock) of the hand-operated element may be effected as follows: the motor is driven in such a way that initially it always moves in one direction (e.g. an opening direction of the valve). This causes the above-described projections of the hand-operated element and the first latching zone of the latching element to be unlocked. As a result the tension force of the working spring no longer acts on the hand-operated element and the above-described friction force is reduced accordingly. This means that the tension force of the lifting spring can then become sufficiently strong to lift the hand-operated element. Thereafter the motor can then move the shaft freely and in particular unhindered by the hand-operated element.

It is pointed out that embodiment variants have been described with reference to different subject matters. It will, however, become immediately clear to the person skilled in the art when reading the present application that, unless explicitly stated otherwise, in addition to a combination of features belonging to one subject matter, an arbitrary combination of features belonging to different subject matters is also possible.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

It is pointed out that features or components of different embodiment variants that are identical or at least functionally identical with the corresponding features or components according to the embodiment variant are labeled with the same reference signs or with a different reference sign which differs from the reference sign of a corresponding component only in its first digit. In order to avoid unnecessary repetitions, features or components already explained with reference to a previously described embodiment variant will not be explained again in detail at a later point.

It is furthermore pointed out that the below-described embodiment variants represent only a limited selection of possible implementation variants. In particular it is possible to combine the features of individual embodiment variants with one another in a suitable manner such that with the implementation variants explicitly described here a multiplicity of different embodiment variants shall be deemed disclosed for the person skilled in the art.

Figure 1:
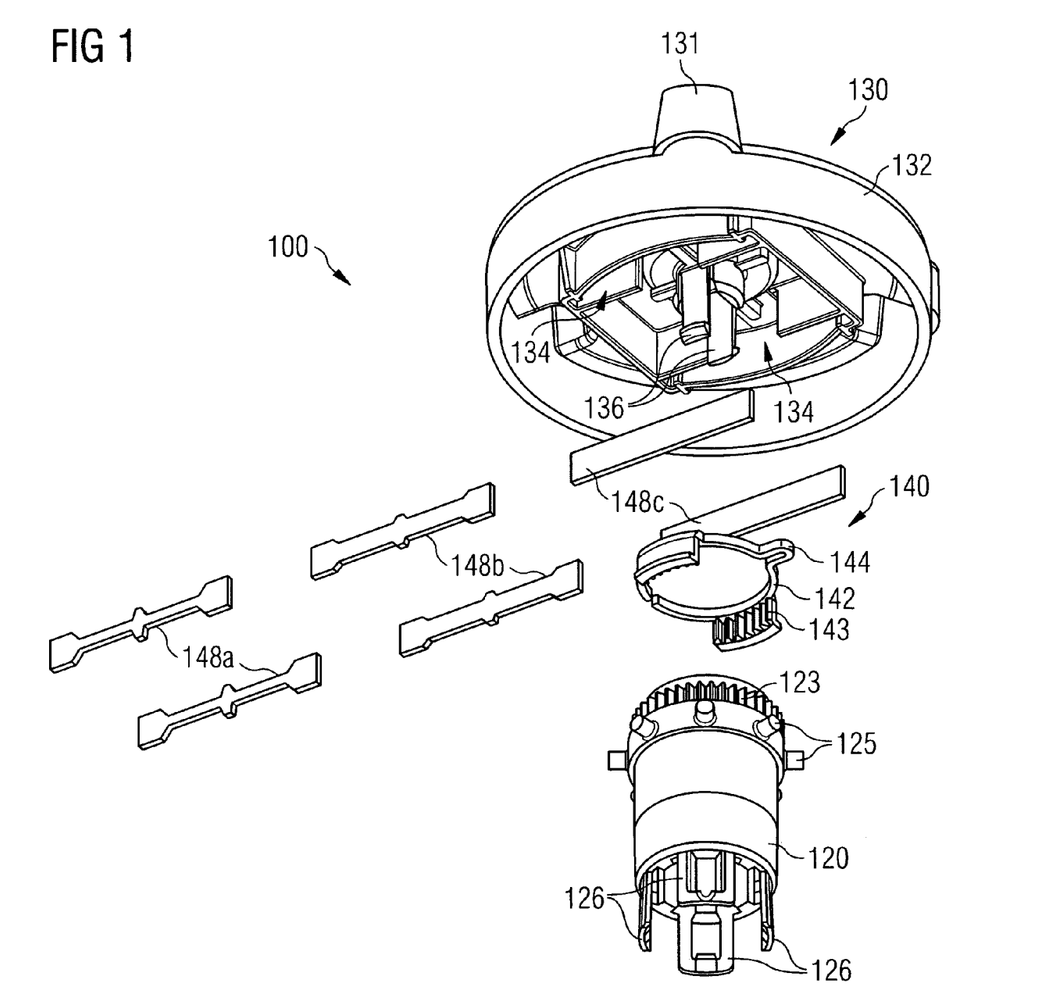
FIG. 1 is a perspective exploded view of a manual adjuster for an actuator and in particular an overload clutch of the manual adjuster which can be equipped with spring elements of different strengths.

FIG. 1 shows in a perspective exploded view a manual adjuster for an actuator 100 according to an exemplary embodiment. The actuator 100 has a shaft 120 which can also be referred to as a central upper shaft. The central upper shaft 120 can namely be connected via the snap-fit projections 126 to a central lower shaft (not shown) which is in turn coupled to an HVAC valve (not shown), where necessary via a gearing mechanism.

The actuator 100 also has a hand-operated element 130 which according to the exemplary embodiment shown here is a simple handwheel. The handwheel 130 can be rotated manually by an operator using the handles 131 for example. The hand-operated element 130 includes a crank housing 132 in which two receiving areas 134 are embodied. Also embodied on the housing 132 are two snap-fit projections 136 so that the hand-operated element 130 can be snapped in place in the shaft 120. In this case the housing and the snap-fit projections 136 are embodied in such a way that the hand-operated element 130 can be rotated relative to the shaft 120.

A plurality of radially projecting cams 125 whose function is explained in more detail below are embodied or mounted on the shaft 120. Also embodied on the shaft 120 is a tooth system 123 which constitutes a part of an overload clutch 140. In addition to the tooth system 123 the overload clutch 140 also has a coupling element 142 on which a tooth system 143 is likewise mounted. According to the exemplary embodiment shown here the tooth system 143 is at least approximately complementary to the tooth system 123, such that the two tooth systems can intermesh with one another. Depending on the force with which the two tooth systems 123 and 143 press against one another or are in contact with one another, a maximum torque is produced which can be transmitted from the housing 132 onto the shaft 120.

As can be seen from FIG. 1, the ring-shaped coupling element 142 which has a convexity 144 can be accommodated in a rotationally fixed manner in the housing 132 of the hand-operated element 130. This means that a maximum torque can be transmitted from the hand-operated element 130 onto the shaft 120 as a function of the force with which the two tooth systems 123 and 143 press against one another.

According to the exemplary embodiment shown here, the force with which the two tooth systems 123 and 143 press against one another can be set through the use of spring elements 148a, 148b, 148c of different strengths. One spring element in each case is namely introduced into one of the two receiving areas 134 and then bears from outside against the coupling element 142 or, as the case may be, against a tooth system section 143. As can be seen from FIG. 1, the different spring elements 148a, 148b, 148c differ from one another by virtue of cutouts of different size. Accordingly the spring elements 148a, 148b, 148c are different from one another by virtue of different local widths, as a result of which in turn (a) the two spring elements 148c exert a comparatively large spring force onto the tooth systems 143, (b) the two spring elements 148b exert a mean spring force onto the tooth systems 143, and (c) the two spring elements 148a exert a comparatively small spring force onto the tooth systems 143. The maximum torque that can be transmitted by the overload clutch from the hand-operated element 130 onto the shaft 120 can therefore be selected as a function of the choice of the spring elements.

It is pointed out that according to the exemplary embodiment shown here the external dimensions of the spring elements 148a, 148b and 148c, each of which represents the function of a leaf spring, are at least approximately equal. This means that during the manufacture of the actuator 100 the maximum transmittable torque can be optimally tailored to the respective requirements by a variant configuration based on the choice of a suitable replaceable leaf spring 148a, 148b or 148c.

Figure 2:
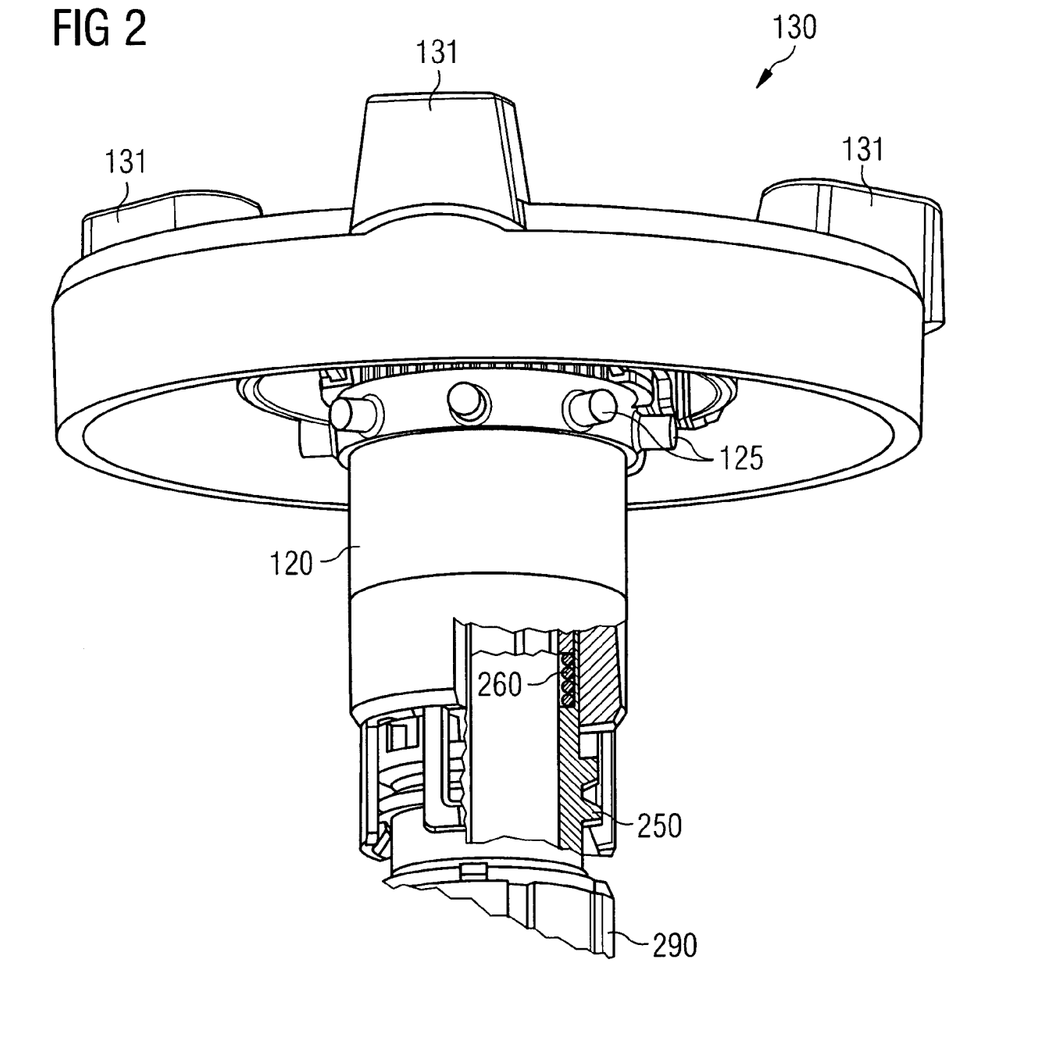
FIG. 2 is a perspective view of a slipping clutch which, during a rotation of the shaft initiated by a motor and/or by a working spring, causes a rotation of the per se decoupled hand-operated element as an indicator device for the rotation of the shaft.

FIG. 2 shows in a perspective view a slipping clutch 250 which is arranged between the shaft 120 and a shaft 290. A certain torque can also be transmitted from the shaft 290 onto the hand-operated element 130 by the slipping clutch 250. Compared to the maximum torque that can be transmitted by the overload clutch 140, however, this torque is significantly smaller.

According to the exemplary embodiment shown here the slipping clutch 250 is used during a rotation of the shaft 290 to rotate the hand-operated element 130 as well, provided the latter is otherwise freely rotatable and in particular is not locked. This has the advantage that an adjustment movement of the actuator initiated for example by a motor (not shown) and/or by a working spring 260 is indicated by a corresponding rotation of the hand-operated element 130. During a rotation of the shaft the hand-operated element 130 therefore constitutes a rotating indicator by which an operator can detect an adjustment movement of the actuator in a simple manner.

According to the exemplary embodiment shown here the shaft 290 is a lower central shaft which is connected to the shaft 120 via the snap-fit projections 126 shown in FIG. 1. The lower central shaft 290 can be coupled directly or via a gearing mechanism (not shown) to an HVAC valve that is likewise not shown in FIG. 2.

Figure 3:
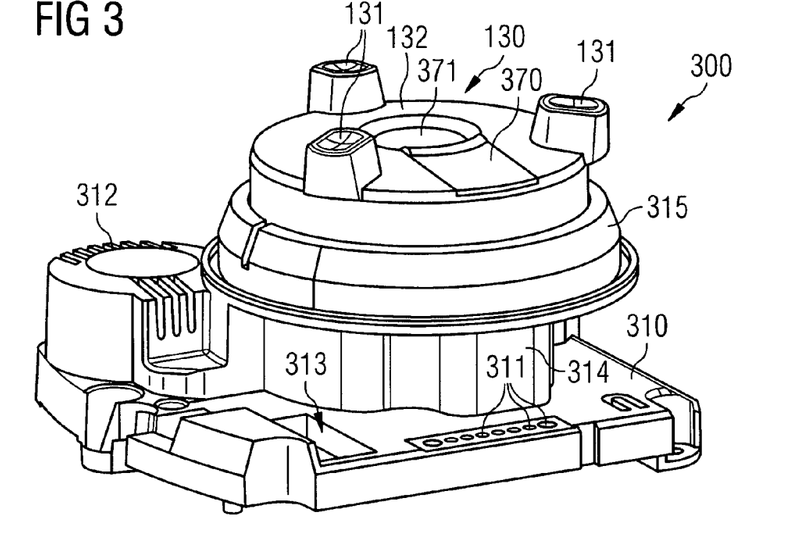
FIG. 3 is a perspective view of a part of an actuator having a hand-operated element which has a radially displaceable locking element for locking the hand-operated element.

FIG. 3 shows in a perspective view a part of an actuator 300 having a hand-operated element 130 which has a radially displaceable locking element 370 for locking the hand-operated element 130. In addition to the upper part recognizable in FIG. 3 the radially displaceable locking element 370 also has a lower part. If the locking element 370 is located in a position displaced radially outward, the lower part of the locking element 370 engages in a projection of the housing 310 of the actuator 300. The hand-operated element 130 can be locked in respect of its rotation angle position and/or in respect of its axial displacement by the engaging locking element 370.

In order to be able to displace the locking element 370 easily when necessary, an intervention opening 371 is embodied in the housing 132 of the hand-operated element 130. This enables an operator to displace the locking element 370 radially outward in a simple manner by an intervention using just one finger.

According to the exemplary embodiment shown here the housing 310 has several inspection passages 311 by which the operation of the actuator 300 can be checked with the housing closed. The housing 310, which according to the exemplary embodiment shown here is a one-piece plastic part, also has a cover 312 for a motor (not shown). An aperture 313 in the housing serves for a cable clamp for the actuator.

Figure 4:
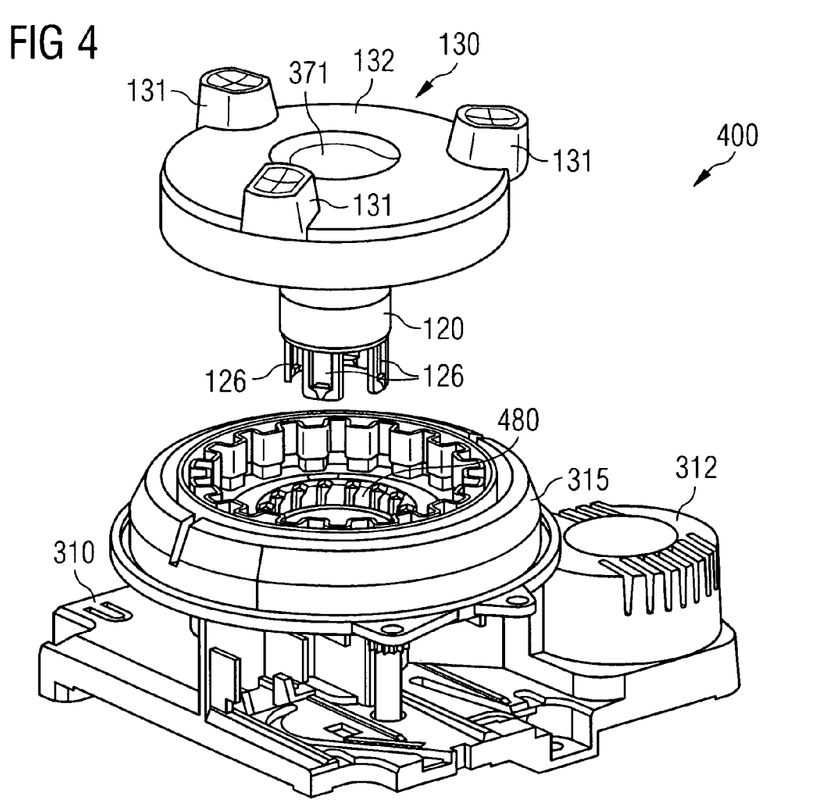
FIG. 4 is a perspective exploded view of a part of an actuator which has a latching element which is arranged between the hand-operated element and the housing and which provides a non-return functionality.

FIG. 4 shows in a perspective exploded view a part of an actuator 400 which has a latching element 480 arranged between the hand-operated element 130 and the housing 310. According to the exemplary embodiment shown here the latching element is a latching ring 480. The latching ring 480 is shaped in such a way that when the hand-operated element 130 is pressed down in the direction of the housing 310 the cams 125 shown in FIGS. 1 and 2 engage in the latching ring 480. Accordingly, during a rotational movement of the hand-operated element 130, the latching ring 480 necessarily rotates as well. In the exemplary embodiment shown here, in the pressed-down or engaged state the shaft 120 is also coupled to the hand-operated element 130. On its outside face the latching ring 480 also has an asymmetrically toothed surface which in conjunction with a corresponding internal surface of the housing 310 constitutes a non-return functionality. In the engaged state of the hand-operated element 130, the hand-operated element 130 can therefore be rotated together with the shaft 120 in one direction only, for example in the clockwise direction. A rotation of the shaft 120 in the opposite direction, for example in the counterclockwise direction, is reliably prevented by the non-return functionality. In this way, after a manual operating intervention in which the hand-operated element 130 has been engaged and possibly also rotated in one direction, the actuator 400 can also remain in its end position. As a result the rotation angle position of the shaft 120 can also be locked in the manually set position.

FIGS. 5a, 5b, 5c and 5d each show in a cross-sectional view an actuator 500 having no working spring. The actuator 500 has a hand-operated element 130 which in turn has a radially displaceable locking element 370 for locking the hand-operated element 130. The actuator 500 corresponds to the actuator 300 shown in FIG. 3.

Figure 5A:
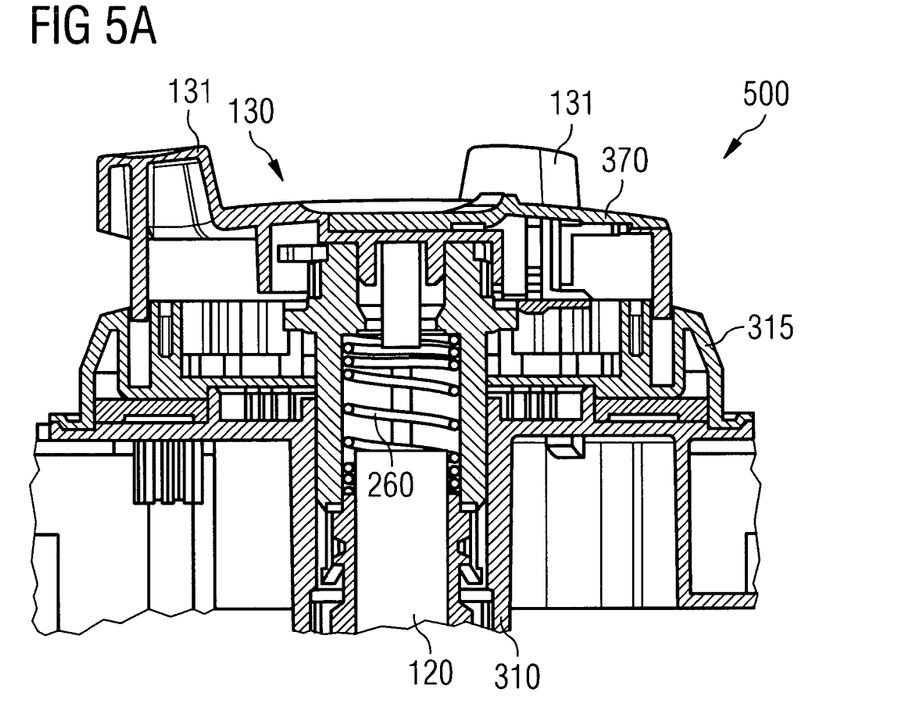
FIGS. 5a, 5b, 5c and 5d each is a cross-sectional view of an actuator having no working spring with a hand-operated element which has a radially displaceable locking element for locking the hand-operated element.

FIG. 5a shows the actuator 500 in its normal state (auto mode). This means that the actuator 500 is driven by a motor (not shown) which engages with the shaft 120. In this case the hand-operated element 130 is located in a disengaged or upper position. Apart from the slipping clutch 250 shown in FIG. 2, the hand-operated element 130 is decoupled from the shaft 120.

Figure 5B:
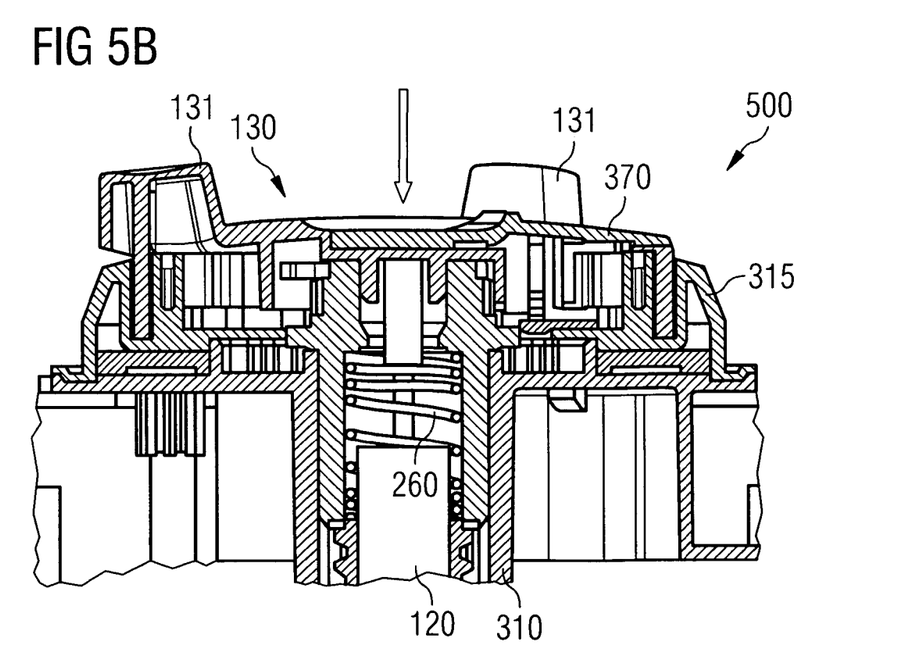

FIG. 5b shows the actuator 500 at the start of a manual operating intervention by an operator. The operating intervention entails a pressing-down (push) of the hand-operated element 130, which is indicated in FIG. 5b by the vertical arrow. In this case a lifting spring 260 is compressed and a mechanical coupling is established between the hand-operated element 130 and the shaft 290. Now the shaft 290 can be rotated by rotation of the hand-operated element 130 in the desired manner. This means that the operator can set a valve coupled to the shaft 290 to any position.

Figure 5C:
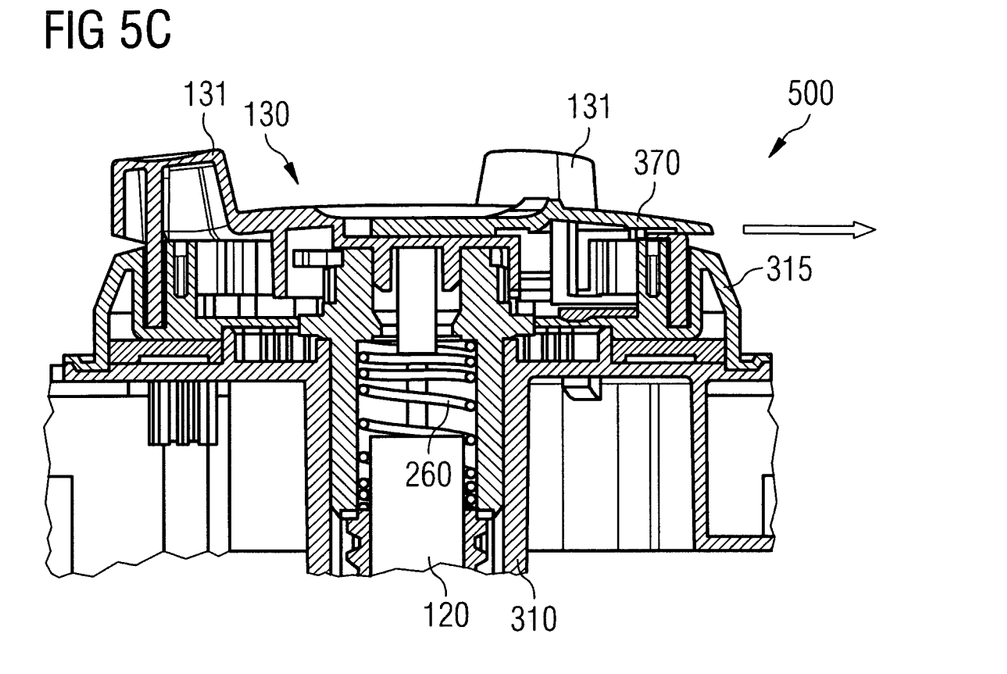

In order to lock the hand-operated element 130 and consequently also the shaft 120 in the manually set position, the locking element 370 is now displaced radially outward. This is illustrated in FIG. 5c. The radial displacement movement is indicated by the horizontal arrow.

Figure 5D:
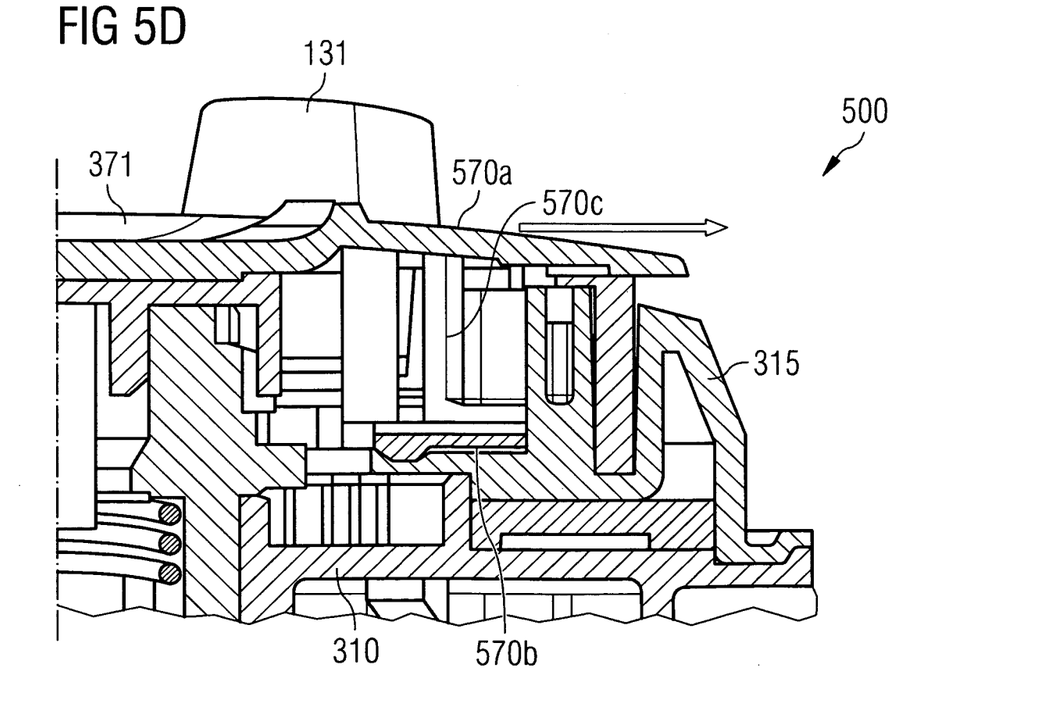

FIG. 5d shows in a magnified view how the locking element engages in the housing 310 according to the exemplary embodiment shown here. The locking element 370 namely has an upper part 570a, a connecting bridge 570c, and a lower part 570b. On the upper part 570a an operator engages the locking element in order to displace it radially outward. After a corresponding radial movement the lower part 570b engages in corresponding structures of the housing 310. According to the exemplary embodiment shown here the hand-operated element 130 is in this case secured both against rotational movements and against an axial displacement.

Figure 6A:
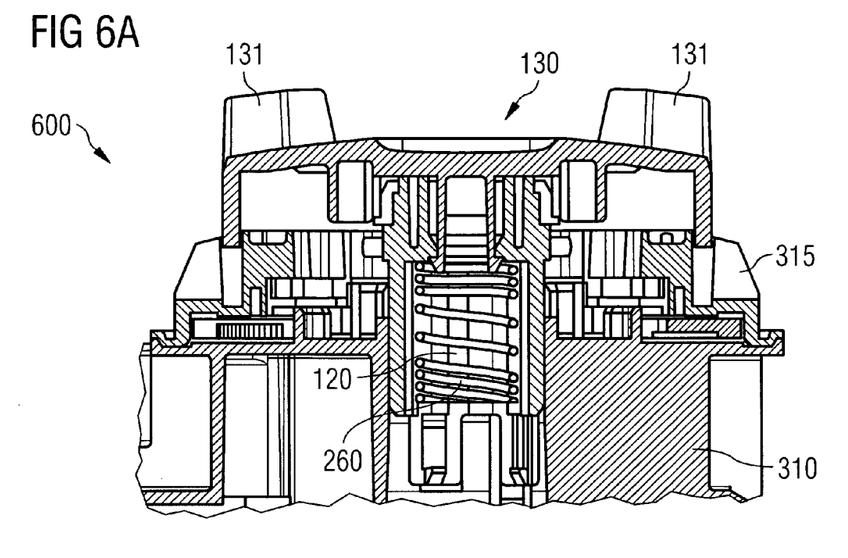
FIGS. 6a and 6b each is a cross-sectional view an actuator having a working spring (not shown) which has a latching element which is arranged between the hand-operated element and the housing and which provides a non-return functionality.
Figure 6B:
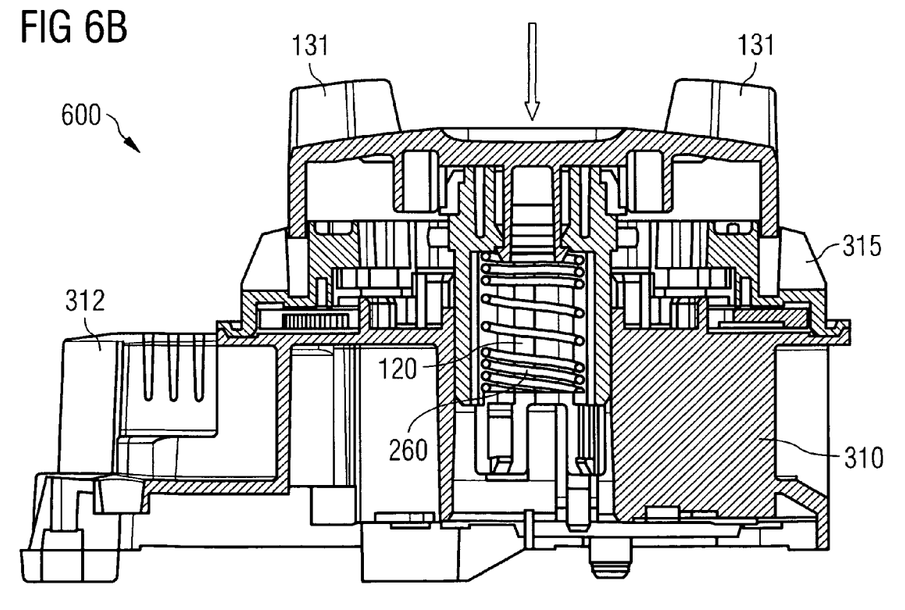

FIGS. 6a and 6b each show in a cross-sectional view an actuator 600 having the lifting spring 260. The actuator has a latching element which is arranged between the hand-operated element 130 and the housing and which provides a non-return functionality. The actuator 600 corresponds to the actuator 400 shown in FIG. 4.

FIG. 6a shows the actuator 600 in its normal state (auto mode). This means that the actuator 600 is driven by a motor (not shown) which engages with the shaft 120. In this case the hand-operated element 130 is located in a disengaged or upper position. Apart from the slipping clutch 250 shown in FIG. 2, the hand-operated element 130 is decoupled from the shaft 290.

FIG. 6b shows the actuator 600 at the start of a manual operating intervention by an operator. The operating intervention entails a pressing-down (push) of the hand-operated element 130, which is indicated in FIG. 6b by the vertical arrow. In this case the lifting spring 260 is compressed and a mechanical coupling is established between the hand-operated element 130 and the shaft 290. The shaft 290 can now be rotated in the desired manner by rotating the hand-operated element 130. This enables the operator to set a valve coupled to the shaft 290 to any desired position.

According to the exemplary embodiment shown here the hand-operated element 130 is locked as a result of the working spring being tensioned due to the manual rotational movement of the hand-operated element 130. When the hand-operated element 130 is released the working spring then rotates the hand-operated element 130 back somewhat until an interlocking is established between the latching element 480 shown in FIG. 4 and the housing 310. In this case a high friction force is produced between the cams 125 shown in FIGS. 1 and 2 and the latching element 480, such that the hand-operated element 130 remains in the corresponding axial position. In this position a rotation of the hand-operated element 130 is inhibited by the latching element 480. As a result both the hand-operated element 130 and the shaft 120 remain in a stable (rotary) position in spite of the action of force of the working spring.

According to the exemplary embodiment shown here the release (delock) of the hand-operated element is effected in that the motor (not shown) is driven in such a way that initially it always moves in a clockwise direction. This causes the cams 125 (see FIGS. 1 and 2) of the hand-operated element 130 to be unlocked from the latching element 480 (see FIG. 4). As a result the tension force of the working spring no longer acts on the hand-operated element 130 and consequently the aforementioned friction force is considerably reduced. Accordingly the tension force of the lifting spring then becomes sufficiently strong to lift the hand-operated element 130. Thereafter the motor can then move the shaft freely in both directions of rotation.

It is pointed out that the actuators described here can be manufactured as part of a standardized production process through suitable variant configuration. This means that by variant configuration different actuators having different switching logic in each case can be realized within one platform for actuators for HVAC valves. Furthermore, a further so-called TSR (TÜV Spring Return) actuator, which has already been described above in the introduction to the description of this document, can also be produced within the same platform.

With a variant configuration of this type, the following functionalities can be assigned to the actuator shown in FIGS. 1, 2, 3, 5a, 5b, 5c and 5d, which is an NSR (Non Spring Return) actuator: (a) indicator for a rotation of the shaft, (b) switchover between motorized and manual operation, (c) locking of the hand-operated element by a radially displaceable locking element, and (d) overload clutch for avoiding damage to actuator elements.

Within the scope of the cited variant configuration, the following functionalities can be assigned to the actuator shown in FIGS. 1, 2, 4, 6a and 6b, which is a WSR (With Spring Return) actuator: (a) indicator for a rotation of the shaft, (b) locking of the hand-operated element by the latching element arranged between hand-operated element and the housing, and (c) overload clutch for avoiding damage to actuator elements (for example a motor and/or a gearing mechanism).

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. An actuator for a valve in a heating, ventilation and/or air conditioning system, comprising:
    a housing;
    a first shaft, arranged at least partially in the housing and coupled directly or indirectly to the valve to adjust the valve during a rotation of the first shaft;
    a hand-operated element coupled to the first shaft and having a crank housing; and
    an overload clutch, arranged between the hand-operated element and the first shaft, limiting a torque transmitted onto the first shaft by the hand-operated element to a predetermined maximum value, the overload clutch including
    a coupling element; and
    a replaceable spring element, formed as an elongate strip and manufactured at least in part from a resilient metal and mounted on the crank housing of the hand-operated element, pressing the coupling element against the first shaft such that the predetermined maximum value for transmittable torque is dependent on the replaceable spring element.

2. The actuator as claimed in claim 1, wherein the coupling element has a first tooth system and the first shaft has a second tooth system, the first tooth system and the second tooth system at least partially intermeshing.

3. The actuator as claimed in claim 2, further comprising a motor coupled to the first shaft.

4. The actuator as claimed in claim 3, further comprising a working spring coupled to the first shaft.

5. The actuator as claimed in claim 4, further comprising
    a second shaft which can be coupled directly or indirectly to the valve, and
    a coupling mechanism, arranged between the first shaft and the second shaft, decoupling the second shaft from the first shaft in a first operating mode and coupling the second shaft to the first shaft in a second operating mode.

6. The actuator as claimed in claim 5,
    wherein the first operating mode is present when the second shaft is in a disengaged position in relation to the first shaft and
    wherein the second operating mode is present when the second shaft is in an engaged position in relation to the first shaft.

7. The actuator as claimed in claim 6, further comprising a slipping clutch, arranged between the first shaft and the second shaft, configured so that the first shaft rotates during a rotation of the second shaft even when the coupling mechanism is in the first operating mode.

8. The actuator as claimed in claim 7, further comprising a locking element mounted on the hand-operated element and preventing adjustment of the hand-operated element relative to the housing during activation of the locking element.

9. The actuator as claimed in claim 8, wherein the locking element is radially displaceable in relation to a longitudinal axis of the first shaft.

10. The actuator as claimed in claim 7,
    wherein the hand-operated element includes first and second surface contours, and
    wherein the actuator further comprises a latching element, arranged between the hand-operated element and the housing, having a first latching zone configured to engage the first surface contour of the hand-operated element and a second latching zone configured to engage the second surface contour of the housing.

11. The actuator as claimed in claim 10, wherein at least one a possibility of the first latching zone engaging the first surface contour and a possibility of the second latching zone engaging the second surface contour is dependent on a position of the hand-operated element.

12. The actuator as claimed in claim 11, wherein at least one of the second latching zone of the latching element and the second surface contour of the housing is shaped so that the latching element has a non-return functionality in relation to the housing.

13. The actuator as claimed in claim 12, further comprising a lifting spring engaging the hand-operated element and exerting a force onto the hand-operated element along the axial direction of the shaft.

\* \* \* \* \*